United States Patent [19]

Eisenhart et al.

[11] Patent Number: 5,652,293

[45] Date of Patent: Jul. 29, 1997

[54] METHOD FOR MAKING AN AQUEOUS EMULSION POLYMER

[75] Inventors: Eric Karl Eisenhart, Doylestown; Bradley Anson Jacobs, Chalfont; Louis Christopher Graziano, Warrington, all of Pa.

[73] Assignee: Rohm and Haas Company, Philadelphia, Pa.

[21] Appl. No.: 551,703

[22] Filed: Oct. 25, 1995

Related U.S. Application Data

[63] Continuation of Ser. No. 239,673, May 9, 1994, abandoned.

[51] Int. Cl.$^6$ ........................................................ C08F 2/16
[52] U.S. Cl. ........................ 524/459; 524/503; 526/78; 526/79; 526/80; 526/81; 526/202; 526/72
[58] Field of Search ............................... 524/459, 503; 526/78, 79, 80, 81, 202, 72

[56] References Cited

U.S. PATENT DOCUMENTS

| | | | |
|---|---|---|---|
| 3,668,170 | 6/1972 | Arai | 156/332 X |
| 3,708,388 | 1/1973 | Lindermann | 156/327 X |
| 4,018,732 | 4/1977 | Lakshmanan | 524/425 |
| 4,020,029 | 4/1977 | Gorbunow | 154/129 |
| 4,316,830 | 2/1982 | Mallon | 524/560 X |
| 4,527,561 | 7/1985 | Hausman et al. | 524/459 |
| 4,617,343 | 10/1986 | Walker | 524/817 |
| 5,143,966 | 9/1992 | Lee et al. | 524/459 |
| 5,216,065 | 6/1993 | Colyer et al. | 524/459 |
| 5,278,211 | 1/1994 | Chandran | 524/117 |
| 5,308,910 | 5/1994 | Yuki et al. | 524/459 X |
| 5,354,803 | 10/1994 | Dragner et al. | 524/459 X |

FOREIGN PATENT DOCUMENTS

| | | |
|---|---|---|
| 1141895 | 2/1983 | Canada. |
| 1274644 | 9/1990 | Canada. |
| 2085206 | 6/1993 | Canada. |
| 394774 | 4/1990 | European Pat. Off.. |
| 1096569 | 12/1967 | United Kingdom. |

OTHER PUBLICATIONS

Handbook of Adhesives, Third Edition, Irving Skeist, Ph.D., Skeist Inc., Whippany, NJ, pp. 437–449.

*Primary Examiner*—Judy M. Reddick
*Attorney, Agent, or Firm*—Joseph F. Leightner

[57] ABSTRACT

A method for making a polymer includes adding a first portion of a colloidal stabilizer to an aqueous medium, adding a monomer mixture, said monomer mixture including a monomer charge and a second portion of colloidal stabilizer and said monomer charge including from about 40 parts by weight to about 70 parts by weight of a vinyl ester monomer per 100 parts by weight monomer charge and from about 30 parts by weight to about 60 parts by weight of a $(C_1-C_{12})$alkyl (meth)acrylate monomer per 100 parts by weight monomer charge, to the aqueous medium and polymerizing the monomers to form an emulsion of the polymer in the aqueous medium.

11 Claims, No Drawings

METHOD FOR MAKING AN AQUEOUS EMULSION POLYMER

This application is a continuation of application Ser. No. 08/239,673, filed May 9, 1994, now abandoned.

The present invention is directed a method for making a polymer and, more specifically, to a method for making a polymer by aqueous emulsion polymerization.

There is a constant effort in the adhesives art to develop aqueous laminating adhesive compositions for wet lamination of substrates, for example packaging materials such as cardboard, that provide improved properties, e.g., adhesion and heat resistance.

A method for making a polymer is disclosed. The method includes adding a first portion of a colloidal stabilizer to an aqueous medium, adding a monomer mixture, said monomer mixture including a monomer charge and a second portion of colloidal stabilizer and said monomer charge including from about 40 parts by weight (pbw) to about 70 pbw of a vinyl ester monomer per 100 pbw monomer charge and from about 30 pbw to about 60 pbw of a $(C_1-C_{12})$alkyl (meth) acrylate monomer per 100 pbw monomer charge, to the aqueous medium and polymerizing the monomers to form an emulsion of the polymer in the aqueous medium. Polymers made by the method exhibit improved heat resistance when employed in adhesive compositions.

Suitable colloidal stabilizers include, for example, hydroxyethyl cellulose, carboxymethyl cellulose, poly(vinyl alcohol), partially hydrolyzed poly(vinyl alcohol), fully hydrolyzed poly(vinyl alcohol), gum arabic and mixtures thereof.

Preferably, the first and second portions of colloidal stabilizer are each independently selected from the group consisting of poly(vinyl alcohol), partially hydrolyzed poly(vinyl alcohol), fully hydrolyzed poly(vinyl alcohol) and mixtures thereof. As used herein, the terminology "poly(vinyl alcohol)" means poly(vinyl alcohol)s that are less than 85% hydrolyzed, the terminology "partially hydrolyzed poly(vinyl alcohol)" means poly(vinyl alcohol)s that are from 85% to 98% hydrolyzed, the terminology "fully hydrolyzed poly(vinyl alcohol)" means poly(vinyl alcohol)s that are more than 98% hydrolyzed, wherein the percent hydrolysis values are calculated on a molar basis. Preferably, the poly(vinyl alcohol), partially hydrolyzed poly(vinyl alcohol) and fully hydrolyzed poly(vinyl alcohol) each have a respective degree of polymerization of about 100 to about 600.

In a preferred embodiment, the first and second portions of colloidal stabilizer are each partially hydrolyzed poly(vinyl alcohol).

In an alternative preferred embodiment, one or both of the first and second portions of stabilizer is a mixture of partially hydrolyzed poly(vinyl alcohol) and fully hydrolyzed poly(vinyl alcohol).

Preferably, the combined amount of the first and second portions of colloidal stabilizer is from about 0.05 pbw to about 10 pbw, more preferably from about 0.1 pbw to about 5 pbw, colloidal stabilizer per 100 pbw total monomer charge. Preferably, the first portion of the colloidal stabilizer includes from about 1 pbw to about 60 pbw, more preferably from about 10 pbw to about 40 pbw, colloidal stabilizer per 100 pbw of the combined amount of the first and second portions of the colloidal stabilizer.

The term "monomer charge" is used herein to denote an amount of monomers added to a reaction vessel containing the aqueous medium by a specific route, e.g., in the monomer mixture, and the term "total monomer charge" is used to denote the total amount of monomers introduced into the reaction vessel in the course of the polymerization reaction, regardless of the route of introduction. In the preferred embodiments of the method of the present invention the terms are effectively synonymous, i.e., all monomers are added in the monomer mixture.

Suitable monomers are disclosed below. In a preferred embodiment, the monomer mixture is added to the aqueous phase at a controlled rate.

The polymerization step of the method is initiated by a free-radical initiator. Suitable initiators include known peroxides, hydroperoxides, persulfates and azo initiators such as, for example, hydrogen peroxide, benzoyl peroxide, tert-butyl hydroperoxide, cumene peroxide, tert-butyl perbenzoate, tert-butyl diperphthalate and methyl ethyl ketone peroxide, ammonium persulfate, sodium persulfate, potassium persulfate, azodiisobutyronitrile and mixtures thereof. The initiator is preferably used at a level of from about 0.01 pbw to 3 pbw per 100 pbw total monomer charge.

In a highly preferred embodiment, the initiator is added into the aqueous phase at a controlled rate.

Optionally, an anionic surfactant, a nonionic surfactant or a mixture thereof may be used in addition to the colloidal stabilizer to stabilize the aqueous reaction mixture and the product emulsion. For example, up to about 5 pbw per 100 pbw total monomer charge of an anionic surfactant such as, for example, alkyl sulfates, alkyl sulfonates, alkyl phenol ethoxysulfates, monoalkyl sulfosuccinates or a mixture thereof, or up to about 10 pbw per 100 pbw total monomer charge of a nonionic surfactant such as, for example, ethoxylated alkyl phenols, poly(ethylene oxide/propylene oxide) block copolymers or a mixture thereof may be used in addition to the colloidal stabilizer.

The molecular weight of the polymer may, optionally, be controlled in a conventional manner using a chain transfer agent. For example, up to about 10 pbw, more preferably, up to about 0.75 pbw per 100 pbw total monomer charge, of a chain transfer agent, for example, a $(C_2-C_{20})$alkyl mercaptan such as, for example, octyl mercaptan and dodecyl mercaptan, esters of mercaptopropionic acid such as, for example, methyl-3-mercaptopropionate and butyl-3-mercaptopropionate or a mixture thereof, may be introduced into the reaction vessel during the polymerization reaction. In a preferred embodiment, the chain transfer agent is dodecyl mercaptan or methyl-3-mercaptopropionate.

The polymer formed by the method of the present invention has repeating units derived from the respective monomers of the total monomer charge. The identity and relative amounts of those monomers are selected, according to methods known in the art, so that the polymer produced by polymerizing the monomers exhibits a $T_g$ in the desired range.

The $T_g$ of a polymer of a proposed composition may be estimated by methods known in the art such as, for example, by calculating the weighted average of the $T_g$ values for homopolymers derived from the respective monomers $M_1$, $M_2$, ... $M_n$, of the reaction mixture, according to equation (1):

$$T_{g(copolymer)} = \sum_{i=1}^{n} w_i T_{gi} \qquad (1)$$

wherein:

$T_g$(copolymer) is the glass transition temperature calculated for the copolymer $w_i$ is the weight fraction of monomer $M_i$ in the copolymer $T_{gi}$ is the glass transition temperature of the homopolymer of $M_i$.

The glass transition temperature of homopolymers may be found, for example, in "Polymer Handbook", edited by J. Brandrup and E. H. Immergut, Interscience Publishers.

The method is advantageously used to make polymers having a $T_g$ of less than or equal to about +15° C. In a preferred embodiment, the polymer has a $T_g$ of from about −40° C. to about +15° C., more preferably from about −35° C. to about 0° C. and still more preferably form about −20° C. to about −5° C.

Suitable vinyl ester monomers include, for example, vinyl acetate, vinyl propionate, vinyl neononanoate, vinyl neodecanoate, vinyl 2-ethylhexanoate, vinyl pivalate, vinyl versatate and mixtures thereof.

As used herein the terminology "$(C_1-C_{12})$alkyl" denotes an alkyl substituent group having from 1 to 12 carbon atoms per group and the terminology "(meth)acrylate monomer" refers collectively to acrylate monomers and methacrylate monomers. Suitable $(C_1-C_{12})$alkyl (meth)acrylate monomers include, for example, ethyl acrylate, butyl acrylate, 2-ethylhexyl acrylate, lauryl acrylate, methyl methacrylate, ethyl methacrylate, butyl methacrylate, isodecyl methacrylate, lauryl methacrylate and mixtures thereof. Preferably, the alkyl (meth)acrylate monomer is butyl acrylate or 2-ethylhexyl acrylate.

In a preferred embodiment, the monomer mixture includes from about 40 pbw to about 60 pbw of a vinyl ester monomer and about 40 pbw to about 60 pbw of a $(C_1-C_{12})$ alkyl (meth)acrylate monomer per 100 pbw total monomer charge.

In a highly preferred embodiment, the monomer mixture includes up to about 10 pbw, more preferably up to about 5 pbw of a monoethylenically unsaturated polar monomer per 100 pbw total monomer charge, provided that the monomer mixture includes no more than 3 pbw, more preferably no more than 2 pbw of the monoethylenically unsaturated carboxylic acid monomer per 100 pbw total monomer charge. The terminology "monoethylenically unsaturated" means having a single site of ethylenic unsaturation per molecule. Suitable monoethylenically unsaturated polar monomers include, for example, $(C_1-C_8)$hydroxyalkyl (meth)acrylate monomers, wherein the terminology "$(C_1-C_8)$ hydroxyalkyl" denotes a hydroxyalkyl substituent group having from 1 to 8 carbon atoms per group, and monoethylenically unsaturated carboxylic acid monomers. Suitable hydroxyalkyl (meth)acrylate monomers include, for example, hydroxyethyl acrylate, hydroxyethyl methacrylate, hydroxybutyl acrylate, hydroxypropyl methacrylate, 1-methyl-2-hydroxyethyl methacrylate and mixtures thereof. Suitable monoethylenically unsaturated carboxylic acid monomers include, for example, acrylic acid, methacrylic acid, itaconic acid, crotonoic acid, fumaric acid and mixtures thereof.

In a more highly preferred embodiment, the monomer mixture includes from about 0.1 pbw to about 10 pbw of a monoethylenically unsaturated polar monomer per 100 pbw total monomer charge. Still more preferably, the vinyl ester/ acrylic copolymer includes from about 0.5 pbw to about 2 pbw of a monoethylenically unsaturated carboxylic acid monomer per 100 pbw total monomer.

The monomer mixture may, optionally, include a small amount, for example, about 0.01 pbw to about 5 pbw, of a polyethylenically unsaturated monomer per 100 pbw total monomer charge, wherein the terminology "polyethylenically unsaturated" means having two or more sites of ethylenic unsaturation per molecule. Suitable polyethylenically unsaturated monomers include, for example, allyl (meth)acrylate, diallyl phthalate, 1,4-butylene glycol di(meth)acrylate, trimethylolpropane tri(meth)acrylate, divinyl ketone, N,N'-methylenediacrylimide, the polyallyl and polyvinyl ethers of pentaerythritol and mixtures thereof.

Optionally, an amount of up to about 20 pbw per 100 pbw total monomer charge of an olefin monomer, such as, e.g., ethylene, may be charged to the reaction vessel and copolymerized with the vinyl ester monomer and the alkyl (meth)acrylate monomer by, e.g., conducting the above-disclosed method in a pressurized reaction vessel and introducing an olefin monomer charge into the pressurized reaction vessel during the polymerization step.

In a preferred embodiment, the polymer is in the form of an aqueous emulsion that includes from about 30 wt % to about 70 wt %, more preferably about 45 wt % to about 60 wt %, polymer solids.

In a preferred embodiment, the polymer solids are in the form of particles of about 100 nanometers to about 4000 nanometers in diameter.

In a preferred embodiment, the polymer emulsion has a viscosity of about 100 centipoise (cP) to about 10,000 cP, more preferably about 200 cP to about 7500 cP. the viscosity of the emulsion may be conveniently measured using a Brookfield viscometer, for example, using a Brookfield Model No. LVT viscometer equipped with a #3 spindle and operated at 12 revolutions per minute.

An adhesive composition includes from about 30 wt % to about 70 wt % of the polymer made by the method of the present invention dispersed in an aqueous medium and may, optionally, further include other additives known in the art such as, for example, plasticizers, emulsifiers, pigments, fillers, curing agents, thickeners, humectants, wetting agents, biocides, adhesion promoters, colorants, waxes and antioxidants.

The adhesive composition is useful for bonding substrates together. The adhesive composition is particularly useful for wet lamination of a plurality of substrate layers, that is, a bonding method wherein layer of the adhesive composition is applied to a first substrate layer, the wet adhesive layer is covered with a second substrate layer and the adhesive layer is then dried to form a laminated article wherein the two substrates are bonded together by the dried adhesive layer. In a preferred embodiment, the substrate layers are in the form of flat sheets of substrate material.

The adhesive composition may be applied to a substrate to be bonded by known techniques such as, for example, roll coating, wire-wound rod coating, knife coating, gravure printing and curtain coating.

Suitable substrates include, for example, paper products such as papers and paperboards, wood, metal films, polymer films and composite substrates, that is, substrates consisting of a combination of dissimilar substrate materials such as polymer-coated paperboards, for example, wax-coated paperboard, and wood products, for example, particle board.

COMPARATIVE EXAMPLE C1

A monomer mixture consisting of 4,480 g butyl acrylate, 3,440 g vinyl acetate, 80.0 g of acrylic acid, 2.4 g of sodium acetate, 1,342.7 g of a 19.9 wt % solution of partially hydrolyzed poly(vinyl alcohol)(nominally 87% to 89% hydrolyzed, Airvol 205, Air Products, Allentown, Pa.) in water and 2,017.3 g of deionized (DI) water was made.

A stirred reactor containing 2,251.6 g of deionized (DI) water and 120.0 g of surfactant (ethoxylated octylphenol having 10 moles ethylene oxide per molecule, Triton X-100, Union Carbide, Danbury, Conn.) was heated to 65° C. under nitrogen. Then 21.0 g of a 0.2 wt % iron (II) sulfate solution in water, followed by a solution of 2 g of aqueous 30 wt % hydrogen peroxide dissolved in 2 g of DI water, were each added to the reaction vessel.

Three separate feed streams were simultaneously introduced and concurrently fed into the reaction vessel:

the monomer mixture was fed into the reaction vessel at a substantially uniform rate over a time period of 165 minutes;

a solution of 15 g of 30 wt % hydrogen peroxide dissolved in 246.0 g of DI water was fed into the reaction vessel at a substantially uniform rate over a time period of 180 minutes; and a solution of 9 g of sodium sulfoxylate formaldehyde dissolved in 251 g of DI water was fed into the reaction vessel at a substantially uniform rate over a time period of 180 minutes.

At the completion of the monomer mixture feed stream, 115 g of DI water was added to the reaction vessel.

The contents of the reaction vessel were cooled to room temperature upon completion of the hydrogen peroxide and the sodium sulfoxylate formaldehyde feed streams.

The pH of the contents of the reaction vessel was then adjusted to a value of 3.8 using a 9 wt % solution of sodium carbonate in water and the solids content of the reaction vessel was adjusted to a nominal, that is, determined by calculation, value of 55 wt % by adding DI water to the reaction vessel.

The product emulsion so formed had a solids content of 55.7 wt % and a viscosity of 1,090 cP (measured using a Brookfield LVT viscometer equipped with a #3 spindle at 12 revolutions per minute). The $T_g$ of the polymer of the emulsion of Comparative Example C1 was estimated to be about −15° C. using equation (1).

EXAMPLES 1–3

The polymer emulsion of Example 1 was made, using the same relative amounts of the respective monomers set forth above in Comparative Example C1, by the method set forth above in Comparative Example C1, except that a smaller amount of partially hydrolyzed poly(vinyl alcohol) was added to the monomer mixture and an additional amount of partially hydrolyzed poly(vinyl alcohol) was added to the stirred reactor along with the water and surfactant charge.

The polymer emulsions of Examples 2 and 3 were prepared by the process described for Example 1, except that different relative amounts of partially hydrolyzed poly(vinyl alcohol) were added to the monomer mixture and added to the stirred reactor.

The relative amounts of partially hydrolyzed poly(vinyl alcohol) added to the monomer mixture ($PVOH_{monomer}$) and of partially hydrolyzed poly(vinyl alcohol) added to the aqueous medium ($PVOH_{aqueous}$) each expressed as weight percents based on the amount of monomer(wt %), are set forth below in TABLE 1.

TABLE 1

| Example # | $PVOH_{monomer}$ (wt %) | $PVOH_{aqueous}$ (wt %) |
| --- | --- | --- |
| C1 | 3.34 | 0.0 |
| 1 | 3.24 | 0.1 |
| 2 | 2.84 | 0.5 |
| 3 | 2.34 | 1.0 |

EXAMPLE 4

The polymer emulsion of Example 4 was made, using the same relative amounts of the respective monomers and using the same method as in Example 3, except that 1.84% of the partially hydrolyzed poly(vinyl alcohol) in the monomer mixture was replaced with 1.84% of fully hydrolyzed poly(vinyl alcohol)(nominally 98% to 98.8% hydrolyzed, Airvol 107, Air Products, Allentown, Pa.).

EXAMPLE 5

A monomer mixture consisting of 450 g butyl acrylate, 540 g vinyl acetate, 10 g of acrylic acid, 1.0 g of sodium acetate, 117.6 g of a 19.9 wt % solution of partially hydrolyzed poly(vinyl alcohol)(nominally 87% to 89% hydrolyzed, Airvol 205, Air Products, Allentown, Pa.)) in water and 302.4 g of deionized (DI) water was made.

A stirred reactor containing 247.6 g of deionized (DI) water, 15.0 g of surfactant (ethoxylated octylphenol having 10 moles ethylene oxide per molecule, Triton X-100, Union Carbide, Danbury, Conn.), and 50.3 g of a 19.9 wt % solution of partially hydrolyzed poly(vinyl alcohol)(Airvol 205) was heated to 65° C. under nitrogen. Then 2.7 g of a 0.2 wt % iron (II) sulfate solution in water, followed by a solution of 0.25 g of aqueous 30 wt % hydrogen peroxide dissolved in 2.5 g of DI water, were each added to the reaction vessel.

Three separate feed streams were simultaneously introduced and concurrently fed into the reaction vessel:

the monomer mixture was fed into the reaction vessel at a substantially uniform rate over a time period of 165 minutes;

a solution of 1.88 g of 30 wt % hydrogen peroxide dissolved in 30.8 g of DI water was fed into the reaction vessel at a substantially uniform rate over a time period of 180 minutes; and a solution of 1.13 g of sodium sulfoxylate formaldehyde dissolved in 31.4 g of DI water was fed into the reaction vessel at a substantially uniform rate over a time period of 180 minutes.

At the completion of the monomer mixture feed stream, 15 g of DI water was added to the reaction vessel.

The contents of the reaction vessel were cooled to room temperature upon completion of the hydrogen peroxide and the sodium sulfoxylate formaldehyde feed streams.

The pH of the contents of the reaction vessel was then adjusted to a value of 4.7 using a 9 wt % solution of sodium carbonate in water and the solids content of the reaction vessel was adjusted to a nominal, that is, determined by calculation, value of 55 wt % by adding DI water to the reaction vessel.

The product emulsion so formed had a solids content of 55.3 wt % and a viscosity of 500 cP (measured using a Brookfield LVT viscometer equipped with a #3 spindle at 12 revolutions per minute). The $T_g$ of the polymer of the emulsion of Example 5 was estimated to be about −6° C. using equation (1).

COMPARATIVE EXAMPLE C2

The emulsion of comparative Example C2 was the made, using the same monomers in the same relative amounts as set forth above in Example 5, by the method set forth above in Example 5, except that in Comparative Example C2 all the partially hydrolyzed poly(vinyl alcohol) was added to the monomer mixture.

EXAMPLE 6

The following method was used to measure the setting speed of each of the emulsions of Examples 1–5 and Comparative Examples C1 and C2. A sheet (approx. 12"× 12") of 50 LB unbleached kraft paper was cut into six to eight strips (1" wide), leaving the strips attached at one end. The uncut end of the strips was placed on top of a second sheet of uncut kraft paper and clamped in place and the strips were folded back to expose the bottom sheet. A line of the adhesive emulsion applied across the bottom sheet, close to the clamp. Using a #18 wire-wound rod, the adhesive emulsion was drawn down the bottom sheet to form an even coating. The cover sheet was immediately closed onto the wet adhesive using another wire-wound rod as a smoothing bar with firm hand pressure to form a laminate. As soon as the laminate was formed, a timer was started and the eight strips were each pulled from the bottom sheet by hand. A respective one of the strips was pulled every two seconds. The time elapsed to achieve 50% or more fiber tear was recorded. An average of three repeated determinations is reported as the setting speed.

The adhesion of each of the emulsions of Examples 1–5 and Comparative Examples C1 and C2 to wax-coated cardboard was determined by the following method. Cardboard (200 pounds per square inch burst strength) was coated with a wax-based coating (Coating 40E, Michelman, Inc., 9080 Shell Road, Cincinnati, Ohio) using a #6 wire-wound rod. The coated board was cured at 105° C. for 1 minute and then allowed to equilibrate in a controlled environment (25° C. and 50% relative humidity) overnight. The wax-coated cardboard was then cut into 2 inch by 4 inch coupons.

A line of polymer emulsion (about 5 g adhesive) was applied along one of the 2 inch wide ends of each of the wax-coated coupons and then drawn down the length of the coupon using a notched stainless steel blade (5 notches per inch, with each notch being about 1/32 inch wide by 1/16 inch deep). A coupon of virgin cardboard, that is, a cardboard coupon having no wax coating and having no emulsion coating, was applied to the wet emulsion-coated side of the coated coupon and a 1 kilogram weight was applied for 4 minutes to compress the combined coupons and adhesive composition. The coupons were then peeled by hand and the amount of fibers torn from the wax-coated coupon was determined visually. The adhesion values reported below in Tables 2A–2C are averages based on the fiber tear results for 10 samples.

The following test procedure was used to characterize the hot strength of the emulsions of Examples 1–5 and Comparative Examples C1 and C2. Linerboard (40 pound) was conditioned overnight at 72° C. and 55% relative humidity (R.H.). The conditioned linerboard was cut to provide large coupons (4 inches×2 inches) and small coupons (about 1 inch by 1 inch). A line was scored on each of the large coupons at a distance of ½ inch from one of the 4 inch long edges of the respective coupon. An adhesive composition was applied to each of the large coupons using a #50 wire wound rod to provide a wet adhesive layer of about 5 mils thickness. Two of the small coupons were applied to the adhesive covered portion of each of the large coupons, overlapping the edge of the large coupon, with one edge of each of the small coupons aligned with the scored line on the large coupon. The laminated structure so formed was then compressed by applying a 100 gram weight to each of the small coupons for 4 minutes. The laminated structures were then conditioned at 72° C. and 55 R.H. overnight. Each of the laminated structures was cut in half to form two test specimens, each consisting of a 1 inch×1 inch coupon bonded to a 2 inch×2 inch coupon. A hole was punched in each of the coupons of each of the respective test specimens and the edge of each of the holes was reinforced with a staple to prevent tearing of the coupons during testing. The test specimens were hung on a shear rack from the hole in the 2 inch×2 inch coupon and positioned in an oven equilibrated at 250° C. A 1 kilogram weight was hung from the hole in each of the respective 1 inch×1 inch coupons of the hanging specimens. The temperature was stepped upward at an increment of 10° C. each hour, up to 320° C. The time to failure for any failing samples was noted. Those specimens that survived one hour at 320° C. were maintained at 300° C. overnight and the number of any additional failed samples was noted the next morning. Each of the times to failure was recorded. The time to failure was expressed as a definite time if a failure was directly observed or, alternatively, was expressed relative to a definite time, for example, less than 8 hours, or as occurring between two definite times, for example, between 8 hours and 24 hours, if the failure was not directly observed.

The results of the hot strength testing are reported as time to failure, t, (calculated as the arithmetic average of results for each of 2 specimens and expressed in hours) for each of the exemplary adhesive compositions.

The setting speed, expressed in seconds, adhesion, expressed as percent area of fiber tear (%) and hot shear strength, expressed in hours, for each of the emulsions of Examples 1–5 and Comparative Examples C1 and C2 are set forth below in TABLES 2A–2C. The tests from which the results reported in each of the respective TABLES 2A–2C were obtained were conducted at different times. In interpreting the results reported in TABLES 2A and 2B it is useful to compare the results for the common example, i.e., the results for Comparative Example C1, to place those results in the context of the day-to-day variation in test results obtained with the same composition.

TABLE 2A

| Example # | Setting Speed (seconds) | 40E Adhesion (%) | Hot Shear Strength (hours) |
| --- | --- | --- | --- |
| C1 | 5 | 40 | 2 |
| 1 | 8 | 50 | 4 |
| 2 | 9 | 40 | 5 |
| 3 | 10 | 10 | 7 |

TABLE 2B

| C1 | 7 | 60 | 1 |
| --- | --- | --- | --- |
| 4 | 10 | 50 | 5 |

TABLE 2C

| C2 | 4 | 30 | 0.5 |
| --- | --- | --- | --- |
| 5 | 5 | 40 | 5.0 |

Polymers made by the method of the present invention, wherein a first portion of a colloidal stabilizer is added directly to an aqueous phase and a second portion of colloidal stabilizer is added in a monomer mixture, provide improved heat resistance compared to polymers of the same nominal composition made by an analogous method wherein all the stabilizer is added with a monomer mixture or wherein all the stabilizer is added directly to the aqueous phase. Polymers made by the method of the present invention impart improved heat resistance to adhesive compositions that are based on the polymers.

We claim:
1. A method for making a polymer, comprising:
  preparing two mixtures:
    a first mixture prepared by adding a first portion of colloidal stabilizer to an aqueous medium;
    a second mixture prepared by adding a monomer mixture, said monomer mixture comprising a mono- mer charge and a second portion of colloidal stabilizer, said monomer charge consisting of from about 40 parts by weight to about 70 parts by weight of a vinyl ester monomer per 100 parts by weight monomer charge, from about 30 parts by weight to about 60 parts by weight of a ($C_1$-$C_{12}$)alkyl (meth) acrylate monomer per 100 parts by weight monomer charge, wherein the combined first and second portions of colloidal stabilizer comprise from about 0.05 parts by weight to about 10 parts by weight colloidal stabilizer per 100 parts by weight monomer charge and wherein the first portion of colloidal stabilizer comprises from about 1 part by weight to about 60 parts by weight colloidal stabilizer per 100 parts by weight of the combined amount of the first and second portions of colloidal stabilizer;

admixing the first and second mixtures; wherein the first and second portion of colloidal stabilizer are independently selected from the group consisting of poly(vinyl alcohol), partially hydrolyzed poly(vinyl alcohol), fully hydrolyzed poly(vinyl alcohol), and mixtures thereof; and polymerizing the monomers of the monomer charge to form an emulsion polymer, said polymer having a glass transition temperature of less than or equal to about +15° C., in the aqueous medium;

further provided that a chain transfer agent is not employed in the method for making the polymer;

such that the polymer provides an adhesive with a hot shear strength of greater than 4 hours.

2. The method of claim 1, wherein the vinyl ester monomer is selected from the group consisting of vinyl acetate, vinyl propionate, vinyl neononanoate, vinyl neodecanoate, vinyl 2-ethylhexanoate, vinyl pivalate, vinyl versatate and mixtures thereof.

3. The method of claim 1, wherein the ($C_1$-$C_{12}$)alkyl (meth)acrylate monomer is selected from the group consisting of ethyl acrylate, butyl acrylate, 2-ethylhexyl acrylate, lauryl acrylate, methyl methacrylate, ethyl methacrylate, butyl methacrylate, isodecyl methacrylate, lauryl methacrylate and mixtures thereof.

4. An adhesive composition comprising an aqueous dispersion of a polymer made by the process of claim 1.

5. The method of claim 1, wherein the polymer has a glass transition temperature of from about −35° C. to about 0° C.

6. A method for making a polymer, comprising:

preparing two mixtures:

a first mixture prepared by adding a first portion of colloidal stabilizer to an aqueous medium;

a second mixture prepared by adding a monomer mixture, said monomer mixture comprising a monomer charge and a second portion of colloidal stabilizer, said monomer charge consisting of from about 40 parts by weight to about 70 parts by weight of a vinyl ester monomer per 100 parts by weight monomer charge, from about 30 parts by weight to about 60 parts by weight of a ($C_1$-$C_{12}$)alkyl (meth) acrylate monomer per 100 parts by weight monomer charge and from about 0.5 parts by weight to about 2 parts by weight of a monoethylenically unsaturated carboxylic acid monomer per 100 parts by weight monomer charge, wherein the combined first and second portions of colloidal stabilizer comprise from about 0.05 parts by weight to about 10 parts by weight colloidal stabilizer per 100 parts by weight monomer charge and wherein the first portion of colloidal stabilizer comprises from about 1 part by weight to about 60 parts by weight colloidal stabilizer per 100 parts by weight of the combined amount of the first and second portions of colloidal stabilizer;

admixing the first and second mixtures; wherein the first and second portion of colloidal stabilizer are independently selected from the group consisting of poly(vinyl alcohol), partially hydrolyzed poly(vinyl alcohol), fully hydrolyzed poly(vinyl alcohol), and mixtures thereof; and polymerizing the monomers of the monomer charge to form an emulsion polymer, said polymer having a glass transition temperature of less than or equal to about +15° C., in the aqueous medium;

further provided that a chain transfer agent is not employed in the method for making the polymer;

such that the polymer provides an adhesive with a hot shear strength of greater than 4 hours.

7. The method of claim 6, wherein the vinyl ester monomer is selected from the group consisting of vinyl acetate, vinyl propionate, vinyl neononanoate, vinyl neodecanoate, vinyl 2-ethylhexanoate, vinyl pivalate, vinyl versatate and mixtures thereof.

8. The method of claim 6, wherein the ($C_1$-$C_{12}$) alkyl (meth)acrylate monomer is selected from the group consisting of ethyl acrylate, butyl acrylate, 2-ethylhexyl acrylate, lauryl acrylate, methyl methacrylate, ethyl methacrylate, butyl methacrylate, isodecyl methacrylate, lauryl methacrylate and mixtures thereof.

9. An adhesive composition comprising an aqueous dispersion of a polymer made from the process of claim 6.

10. The method of claim 6, wherein the polymer has a glass transition temperature of from about −35° C. to about 0° C.

11. The method of claim 6, wherein the monoethylenically unsaturated carboxylic acid monomer is acrylic acid.

* * * * *